United States Patent [19]
Cone et al.

[11] Patent Number: 5,796,374
[45] Date of Patent: Aug. 18, 1998

[54] SUPPORT FOR A HEAD MOUNTED DISPLAY SYSTEM

[75] Inventors: George Cone, Redmond, Wash.; Stephen Peart, Los Satos, Calif.; Joel Robinson, Seattle; Wes Williams, Arlington, both of Wash.

[73] Assignee: Virtual Vision, Inc., Redmond, Wash.

[21] Appl. No.: 613,132

[22] Filed: Mar. 8, 1996

[51] Int. Cl.$^6$ ............................................. G09G 5/00
[52] U.S. Cl. ........................................................ 345/8
[58] Field of Search ........................... 345/7, 8, 9; 359/13, 359/630, 631; 128/857, 858, 859; 2/421, 15, 428, 429

[56] References Cited

U.S. PATENT DOCUMENTS

| | | |
|---|---|---|
| 3,513,482 | 5/1970 | Holden . |
| 3,594,815 | 7/1971 | Reese ............................... 2/421 |
| 4,398,799 | 8/1983 | Swift ................................ 345/8 |
| 5,003,300 | 3/1991 | Wells . |
| 5,089,914 | 2/1992 | Prescott .......................... 345/8 |
| 5,158,089 | 10/1992 | Swezey et al. . |
| 5,162,828 | 11/1992 | Furness et al. . |
| 5,546,099 | 8/1996 | Quint et al. ..................... 345/8 |

*Primary Examiner*—Regina Liang
*Attorney, Agent, or Firm*—McAndrews, Held & Malloy, Ltd.

[57] ABSTRACT

A support is shown for an image display system that is to be worn on a user's head. The image display system includes an image generating module with at least one optical element into which a user looks to view a generated image and an electronics module, both of these modules being removably mountable on the support. The support includes a head hugging member having a front portion, a pair of side portions, a top portion and a back portion integrally formed from a material with multidirectional elasticity so that the side, top and back portions conform to and hug the user's head. The support also includes a rigid bill secured to the front portion of the head hugging member so that it extends outwardly from a user's forehead for providing a rigid support onto which the image generating module is mounted. Whereas the image generating module is mounted on the front of the support, the electronics module is removably mounted on a back portion of the support to provide a head mounted display system the weight of which is distributed over the user's entire head. In a second embodiment the support is formed of a cloth cap with a rigid bill for supporting the image generating module.

20 Claims, 6 Drawing Sheets

SUPPORT FOR A HEAD MOUNTED DISPLAY SYSTEM

FIELD OF INVENTION

The present invention relates to a support for an image display system to be worn on a user's head and more particularly, to a support having a head hugging member made of a material that has multidirectional elasticity to conform to and hug a user's head and a rigid bill secured to a front of the head hugging member for removably mounting an image generating module of the display system.

BACKGROUND OF THE INVENTION

Head mounted display systems are known that include a frame that is worn on a user's head to support the display system. Because known head mounted display systems have been large and heavy, the frame that supports the system on a user's head has been formed as a helmet such as shown in U.S. Pat. No. 5,093,567. However, helmets themselves are heavy and add considerably to the overall weight of the system. Further, a helmet of one size can fit only a limited number of people making such a support undesirable for applications in which a large number of users are required to wear the system. Compact head mounted display systems are also known to employ rigid frames similar to a pair of glasses such as shown in U.S. Pat. No. 5,162,828. This type of frame is more lightweight than a helmet and can accommodate more people. However, the optical system supported by such a rigid frame needs to be adjustably mounted on the frame so as to enable the optics to be positioned precisely with respect to various users' eyes. Such adjustable mountings can be complex and can further increase the complexity of the optical design with a resulting increase in the cost of the overall system. It has further been found that it is difficult for some users to position the optic precisely with such adjustable mounting. If the optic is not in the correct position for an individual user, the image projected by the optic can appear out of focus and/or distorted.

SUMMARY OF THE INVENTION

In accordance with the present invention, the disadvantages of prior supports for a head mounted display system have been overcome. The support for the head mounted display system of the present invention is lightweight and conformable so as to accommodate different users while maintaining the display system securely on the user's head.

More particularly, the head worn support of the present invention accommodates an image display system having an image generating module with at least one optical element into which a user looks to view a generated image. The support includes a head hugging member having a front portion, a pair of side portions, a top portion and a back portion integrally formed from a material with multidirectional elasticity so that the side, top and back portions conform to and hug the user's head. A rigid bill is secured to the front portion of the flexible, head hugging member and extends outwardly from a user's forehead. The rigid bill includes an aperture therein through which a portion of the image generating module of the display system extends for removably mounting the image generating module on the bill.

The head hugging member allows the optical element to be moved to and maintained in a desired position with respect to the user's eye without a complex mounting structure for the optical element. As the optical element is moved to a desired position, the head hugging member moves slightly. Once the user releases the optical element, the head hugging member maintains the optical element in the same position to which it was moved. The rigid bill can support the image generating module at a sufficient distance from the user's eye so that a conventional pair of glasses or safety glasses can be worn by the user such that they are positioned between the user's eye and the image generating module. Because the image generating module is not fixedly mounted on the support, the support of the present invention can easily be cleaned in a washing machine. Further, the support may be manufactured at a very low cost. If many users require the use of the display system but at different times during the day, for example, on different work shifts, each of the users can have their own support while sharing a single image generating module so as to reduce the cost of employing head mounted display systems for many applications.

These and other advantages and novel features of the present invention, as well as details of an illustrated embodiment thereof, will be more fully understood from the following description and drawings.

DESCRIPTION OF THE PREFERRED EMBODIMENT

Figures 1, 2, 3:
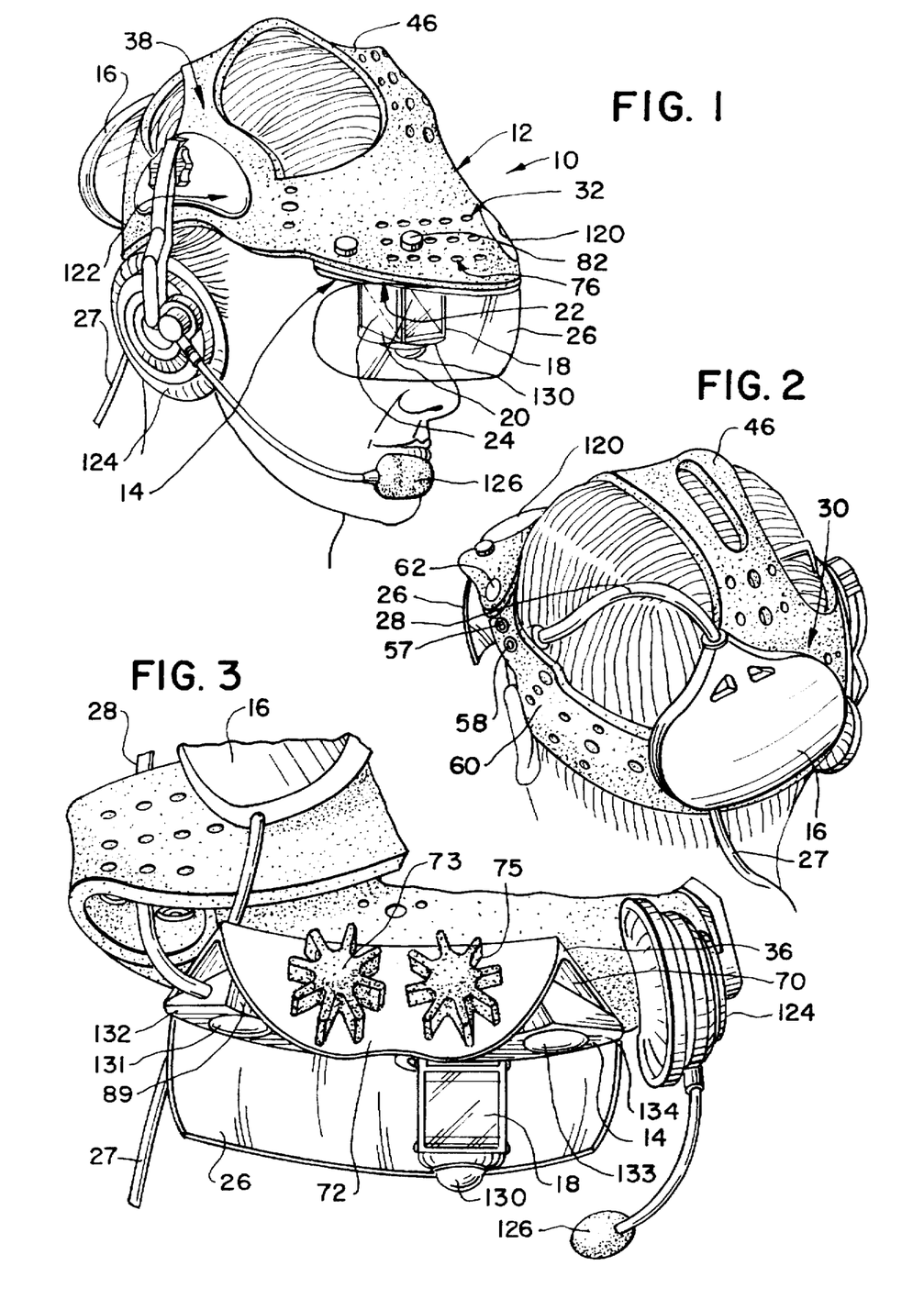
FIG. 1 is a front perspective view of the support for an image display system worn on a user's head as taken from one side.
FIG. 2 is a back perspective view of the support of FIG. 1 taken from the opposite side.
FIG. 3 is a partial back view of the support and display system of FIG. 1 illustrating the interior of the front of the support.

A head mounted display system 10, as shown in FIGS. 1–2, includes a support 12 that is worn on a user's head. The display system includes an image generating module 14 that forms a single, integral unit that is removably mounted on the support 12 and an associated electronics module 16 that is also removably mounted on the support 12.

The image generating module 14 includes an optical element 18 into which a user looks to view a generated image. The optical element 18 is preferably a solid block optical element as described in detail in U.S. patent application Ser. No. 08/584,541 filed Jan. 8, 1996 and incorporated herein by reference. As described in detail therein, the optical element 18 includes a fully reflective surface 20 that reflects an image from a liquid crystal display 22, mounted opposite to the surface 20, onto a partially reflective surface 24. The partially reflective surface 24 in turn reflects the displayed image into the user's eye. The reflective surface 20 is shaped so as magnify the displayed image and to focus the image so that it appears to be at a desired distance from the user. Because the surface 24 is partially reflective, the displayed image appears to the user to be superimposed on the real world. In order to control the amount of ambient light entering the system and the brightness of the displayed image with respect to the brightness of the real world, a tinted visor 26 is mounted on the outside of the support 12 so that the optical element 18 is between the visor and the user's eye. The optical element 18 is mounted on the support 12 so that it is fairly close to the user's eye. However, the optical element 18 can be spaced from the user's eye by a distance that is sufficient to accommodate a pair of conventional eyeglasses or safety glasses therebetween if desired.

The image generating module 14 includes some or all of the electronics of the system 10 such as a driver for the display 22 and the like. Some of the control electronics for the system 10, however, including the power supply are preferably housed in the electronics module 16 that is electrically connected via a cable 28 to the image generating module 14. The electronics module 16 is further connected via a cable 27 to a hand-held or body-worn unit, not shown, that forms a portable computer, data collector and/or video source such as a television tuner or the like. The electronics module 16 is mounted on a back portion 30 of the support 12 so as to act as a counterweight to the image display module 14 which, as shown, is mounted on a front portion 32 of the support 12 so that the head mounted display system 10 feels balanced on the user's head.

Figure 4:
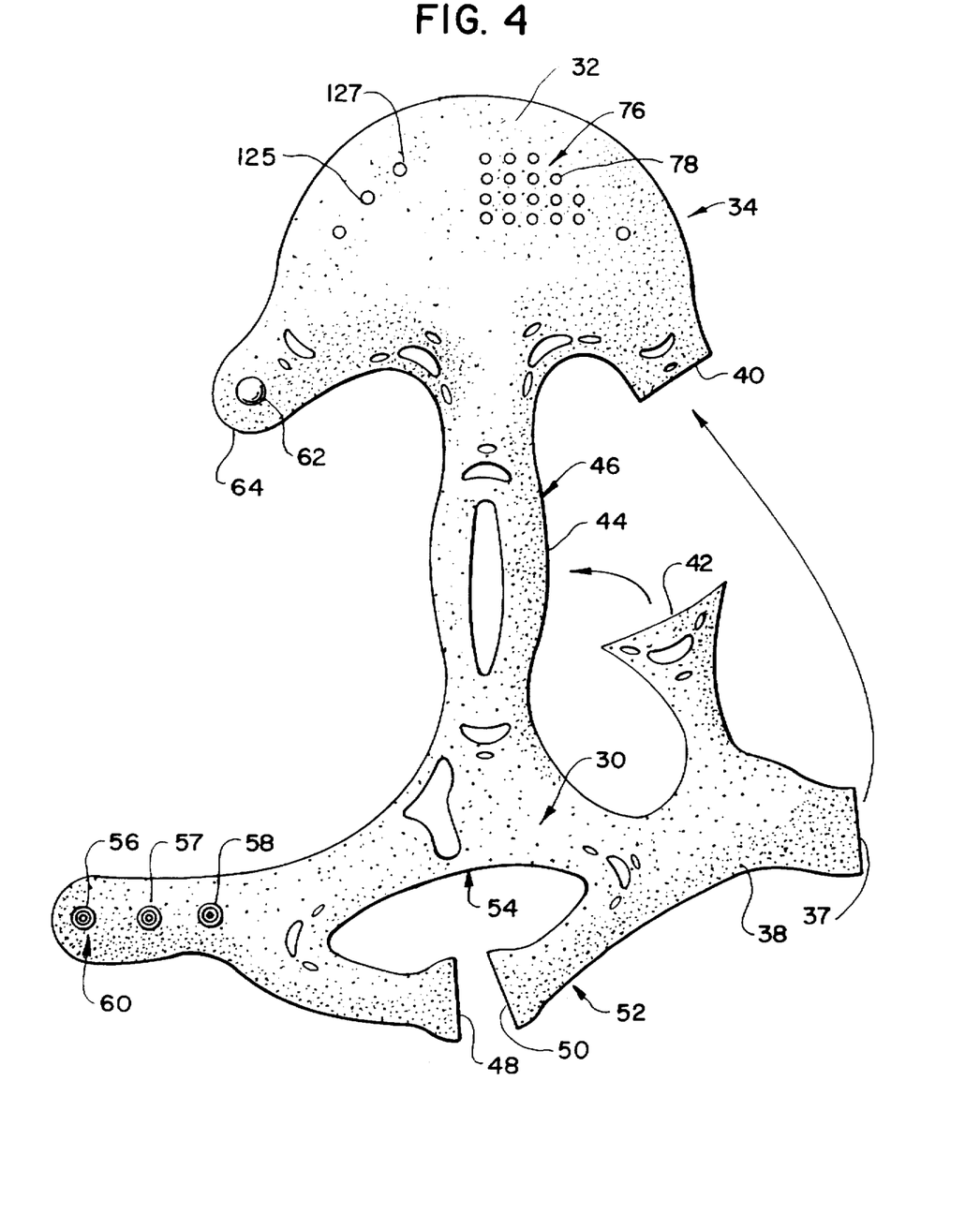
FIG. 4 is a top view of the flexible, head hugging member of the support of FIG. 1 as it may be stamped from a piece of material.
Figure 5:
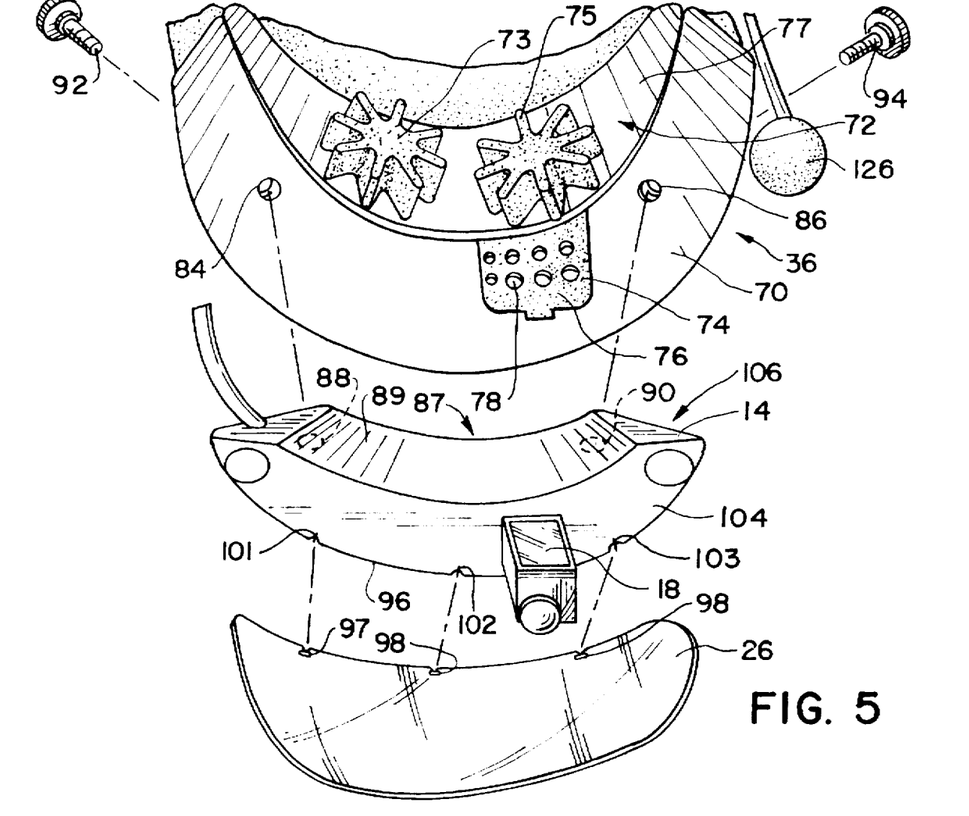
FIG. 5 is an exploded view taken from the bottom of the support of FIG. 1 illustrating the rigid bill, image generating module and a tinted visor.

The support 12 includes a head hugging member 34 as shown in detail in FIG. 4 and a rigid bill 36 as shown in FIGS. 3 and 5. The head hugging member 34 may be formed from a single piece of material with multidirectional elasticity, such as a sponge rubber material like microcellular neoprene, polyurethane foam, latex foam etc., by stamping the material in the pattern shown in FIG. 4. When the head hugging member 34 is made of microcellular neoprene, the neoprene is preferably backed with a knitted material such as jersey. Although a jersey backing can be used on both sides of the neoprene for environments requiring an extremely hard wearing support, it is preferred that the jersey backing be only on one side of the member 34 so that the head hugging member 34 maintains a high degree of stretch and conformability. The jersey backing reinforces the sponge rubber, microcellular neoprene and provides a limit on the amount of stretch of the sponge rubber allowed, thus preventing tears. When placed so that it is on the underside of the member 34, abutting the user's head, the backing also provides moisture wicking such that moisture is moved away from the user's head. Further, the knit backing when placed on the underside of the member 34 will not grip the user's head as much as the sponge rubber material so that the member 34 can be moved easily while still hugging the user's head to maintain the member 34 in a desired position on the head. This feature allows the optical element 18 to be easily and precisely positioned relative to a user's eye. The user merely grips the optic and moves it to a desired position. As the optic is being moved, the head hugging member 34 moves slightly. Once the user releases the optical element 18 in a desired position, the head hugging member 34 maintains the element 18 in that position. It is noted that small perforation on the order of 1/64 inch to 1/8 inch may be made in the sponge rubber and knit backing for added air ventilation if desired.

To shape the head hugging member 34 so as to conform generally to the curved shape of a head, an end 37 of a side portion 38 is bonded by an adhesive or otherwise attached to an end 40 of a side of the front portion 32 of the head hugging member 34. Further, an upper end 42 of the side portion 38 is attached to the side 44 of a top portion 46 of the head hugging member 34. Similarly, the ends 48 and 50 of the back portion 30 of the head hugging member 34 are attached to form a lower strap 52 that is shorter than an upper strap portion 54 of the head hugging member's back 30. Three snap connectors 56, 57 and 58 are linearly disposed along a second side portion 60 of the flexible head hugging member 34 wherein each of these members is mateable with a snap connector 62 that is attached to an end 64 of a side of the front portion 32 of the head hugging member 34. The plural snap connectors 56–58 enable a single size flexible head hugging member 34 to accommodate a large group of users. Because the flexible member 34 is formed of a material with multidirectional elasticity such as neoprene sponge rubber, the member 34 hugs or grabs the user's head with the member 34 conforming to the head so as to securely maintain the display system 10 in place. Further, since the member 34 includes a top portion 46 as well as side portions 38 and 60, the weight of the modules 14 and 16 are distributed over the user's entire head. The lower strap 52 of the back portion 30 is such as to engage the back of the user's head at the base of the head, adjacent to the user's neck. The strap 52 thus maintains the head mounted display system 10 securely on the user's head when it is tilted far back or when the user is laying on his back for a particular application of the system 10. Thus, regardless of the orientation of the user's head, the display system 10 is securely maintained in position by the head hugging member 34.

The rigid bill 36 includes and outwardly extending portion 70 on which the image generating module 14 is removably mounted and the bill 36 also includes a downwardly extending portion 72 that is arcuately shaped or contoured so as to conform generally to the shape of a user's forehead which will abut the portion 72 when the support 12 is worn. The portions 70 and 72 of the bill 36 may be integrally formed of a single piece of molded plastic or, alternatively, the portions 70 and 72 may be molded separately and attached together. The front portion 32 of the head hugging member 34 is attached to a top surface of the bill portion 70 by an adhesive so that the front portion 32 of the head hugging member 34 overlies the rigid bill 36 as shown in FIG. 1. Preferably, the adhesive employed to attach the member 34 to the bill 36 is waterproof so that the support 12 can be cleaned in a washing machine when the image generating module 14 and the electronics module 16 are removed.

The bill portion 70 includes a rectangular aperture 74 therein so as to accommodate a housing 80 for the display 22 of the image generating module 14. The display housing 80 extends through the aperture 74 of the bill portion 70 when the image generating module 14 is mounted onto the bill 36. It is noted that formed on re 74 can be formed on the left side of the bill portion 70 as well as on the right side thereof as shown. Further, two such apertures 74 may be formed in the bill portion 70 to accommodate two displays and associated optical elements in a binocular system. The front portion 32 of the head hugging member 34 includes an area 76 with a number of holes 78 therein wherein the area 76 overlies the aperture 74 as well as the display housing 80 so as to provide ventilation for any heat generated by the display 22. One of the holes 78 may also allow a focus adjustment knob 82 protruding from the display housing 80 to extend through the head hugging member 34 so as to be accessible by a user.

The bill portion 70 includes a pair of generally circular apertures 84 and 86 on opposite sides of the bill portion 70. The apertures 84 and 86 in the bill portion 70 are aligned with threaded apertures in a top surface 87 of the image generating module 14 when the module 14 is positioned such that the top surface 87 thereof abuts the bill portion 70 and a back surface 89 of the module 14 abuts the downwardly extending bill portion 72. A pair of screws 92 and 94 extend through respective apertures 84 and 86 of the bill portion 70 and are threaded into the apertures 88 and 90 of the module 14 so as to removably mount the image generating module 14 onto the rigid bill 36. When the module 14 is thus mounted on the support 12, the optical element 18 is positioned and maintained at a precise and desired location with respect to the user's eye by merely moving the optical element 18 as described above.

Figure 6:
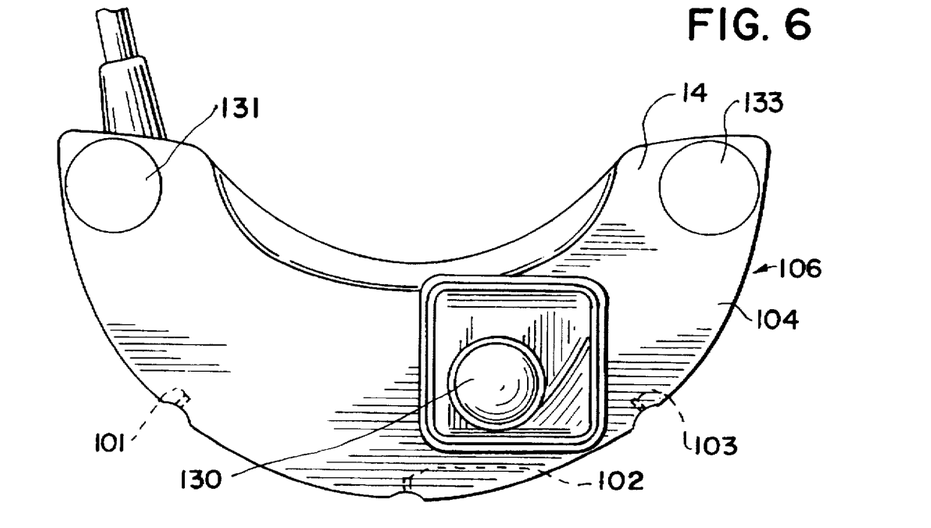
FIG. 6 is a bottom view of the image generating module of FIG. 5.
Figure 7:
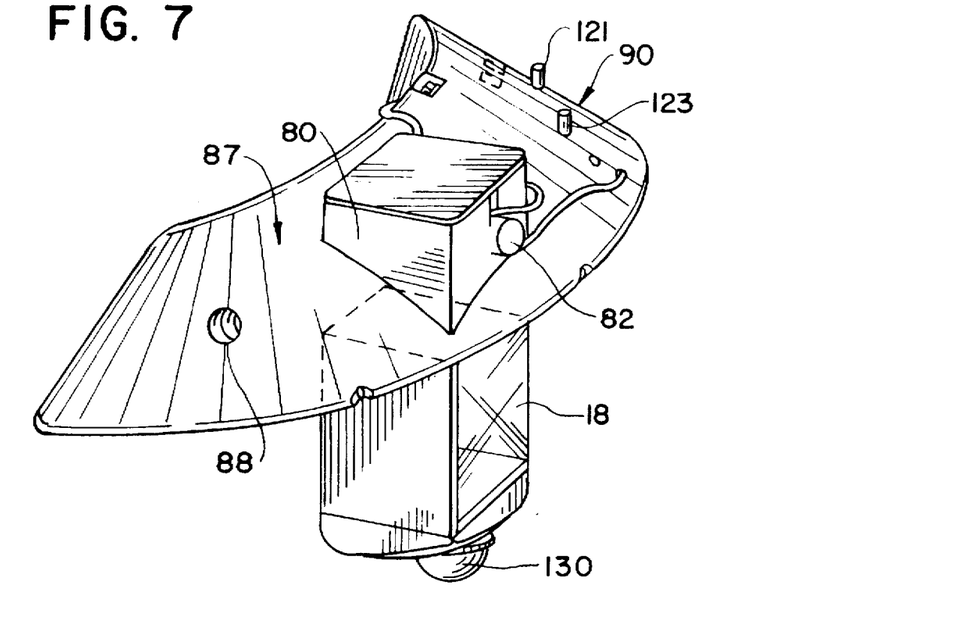
FIG. 7 is a side perspective view of the image generating module of FIG. 5.

The visor 26 may be removably mounted on an outer edge of the bill portion 70. Alternatively, the visor 26 may be removably mounted on a lower outer edge 96 of the image generating module 14. In this later embodiment, the visor 26 is provided with inwardly extending peg members 97–99 that are respectively insertable into small cylindrical apertures 101–103 formed in a bottom wall 104 of the housing 106 for the image generating module 14.

In order to provide a cushion between the user's head and the plastic bill portion 72, a pair of star-shaped conformable members 73 and 75 are attached by an adhesive or the like to an inner surface 77 of the bill member 72. The members 73 and 75 provide a cushion between the user's forehead and the bill 72 while conforming to the user's forehead. Preferably, the members 73 and 75 are formed of a heat sensitive closed cell polyurethane material such as ISO-LOSS Confor made by E.A.R. Specialty Composites and having a hardness value of 46 at 16° C., 8 at 21° C. and 4 at 38° C. according to ASTM D2240 and a density of 5 ½ lbs./ft.$^3$–7 lbs./ft.$^3$. This material is such that it will conform to the shape of a user's forehead when heated by the user's body temperature without creating pressure on the user's forehead at the point of compression.

Because the user's body heat softens the material, the material provides a soft cushion against the user's forehead that will not leave marks. However, since the plastic bill portion 72 to which the members 73 and 75 are attached does not generate heat, that portion of the material abutting the bill portion 72 will be harder than the portion abutting the user's forehead. This harder portion of the material is such as to provide good support for the bill portion 72 on the user's head.

Figure 8:
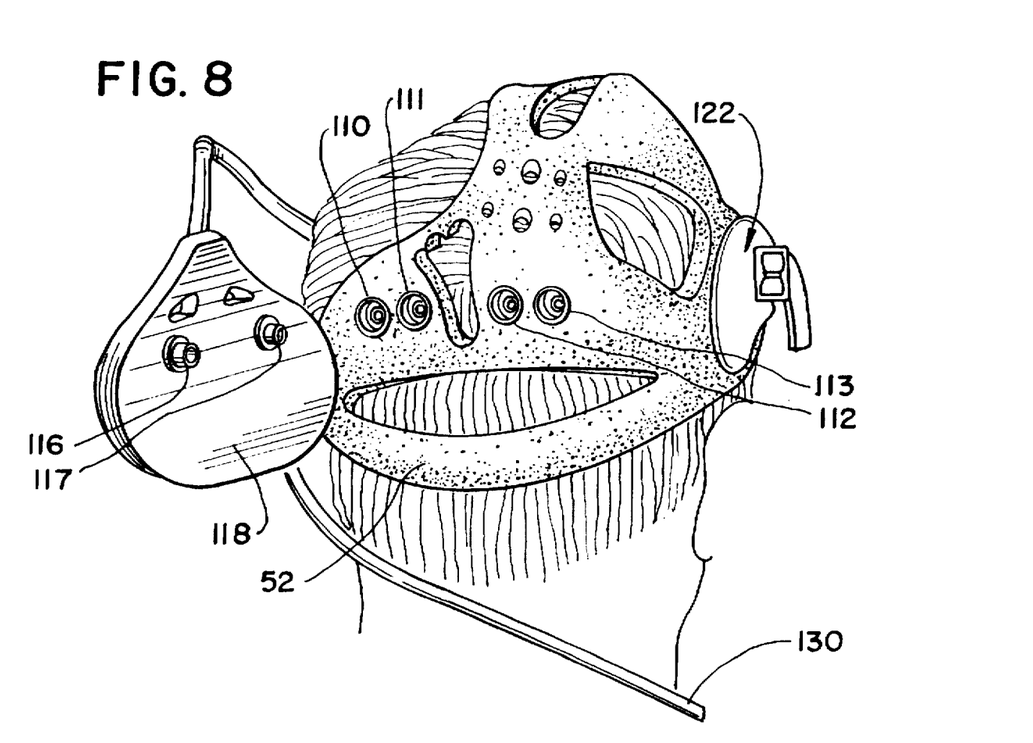
FIG. 8 is a back perspective view of the support of FIG. 1 illustrating the mounting for an electronic module.

In order to removably mount the electronics modules 16 on the back portion 30 of the head hugging member 34, the back portion 30 includes four snap connectors 110–113, that are connectable with a pair of mating snap connectors 116, 117 disposed on a surface 118 of the electronics module 16. Although only two snap connectors are needed on the back portion 30 of the head hugging member 34, by utilizing four such connectors, the user may adjustably position the electronics module 16 on the back of the support 12 so that it is in the most comfortable position for a given user.

Figure 9:
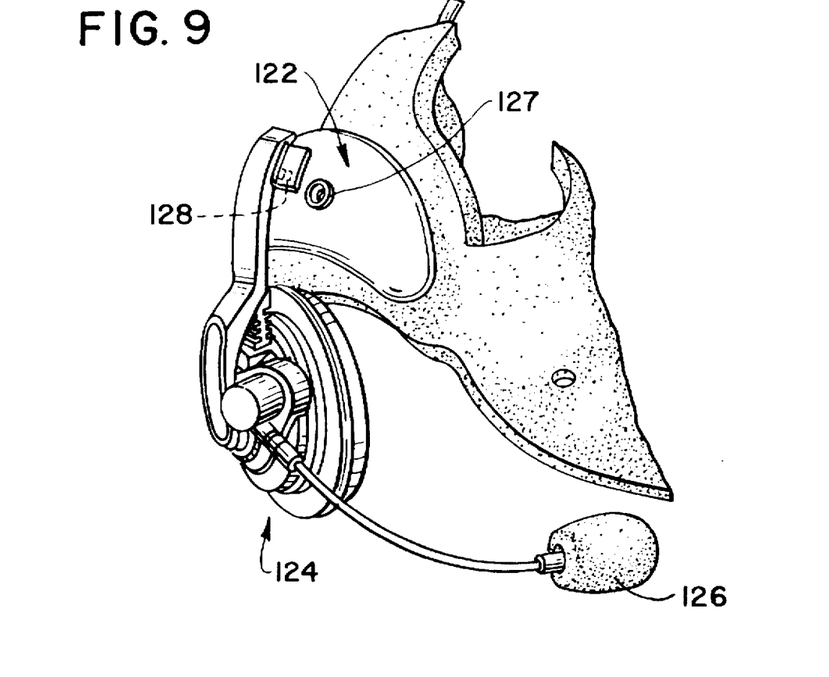
FIG. 9 is an exploded view illustrating the mounting for an earphone and boom assembly so that it is removable from the support of FIG. 1.

Two rigid accessory attachment plates 120 and 122 formed of molded plastic are attached to the head hugging member 34 for removably mounting an accessory to the front of the support 12 or to the side thereof. For example, if a CCD camera or the like is desired for head tracking, spatial tracking and/or surveillance applications, the camera may be removably mounted on the front accessory attachment plate 120. In order to register i.e., precisely locate, the camera with respect to the optical element 18, the bill portion 70 is formed with a pair of locating pins 121 and 123 that are at a known fixed position with respect to the aperture 74 that accommodates the display housing 80 and serves to locate the optical element 18 on the bill. The locating pins 121 and 123 extend through apertures 125 and 127 in the head hugging member 34 and into respective apertures, not shown, in the accessory attachment plate 120 so as to precisely locate the plate 120 and accessory, such as a camera, with respect to the optical element 18 and the display 22. The side accessory attachment plate allows an earphone 124-boom 126 assembly to be removably mounted onto the side of the support 12. Each of the accessory attachment plates 120, 122 includes a threaded aperture such as shown at 126 for the side accessory attachment plate 122. The threaded aperture 126 receives a threaded protrusion 128 that extends from the accessory to be attached such as shown for the earphone 124-boom 126 assembly. The boom 126 may be used to pick up voice commands from the user wherein such commands are utilized to control the information that is depicted on the display 22 and viewed by the user wherein the electronics module 16 or the hand-held unit attached thereto includes voice recognition circuitry and software. It is noted that, if the earphone 124-boom 126 assembly is not desired, a speech pick up unit such as a microphone may be attached as shown at 130 to the bottom surface of the optical element 18. Speakers 131 and 133 may also be positioned within the image generating module 14 on the bottom surface 104 near the outer ends 132 and 134. This positioning of speakers 131, 133 is sufficiently close to the user's ears so that the user can hear sounds emanating therefrom.

Figure 10:
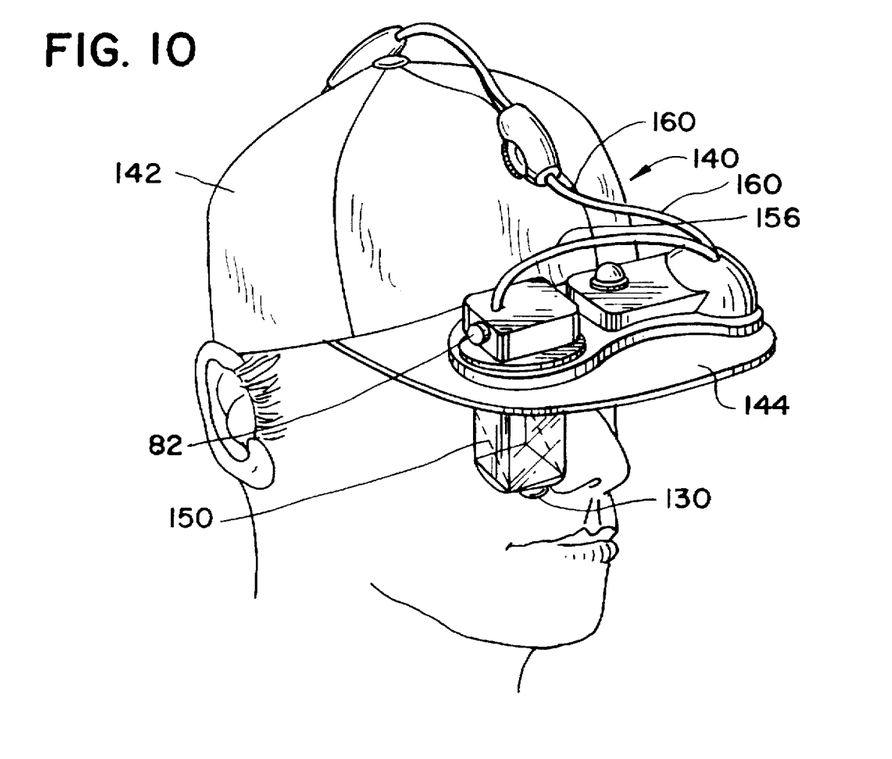
FIG. 10 is a front perspective view of an alternative embodiment of a support for a head mounted display system in accordance with the present invention.
Figures 11, 12:
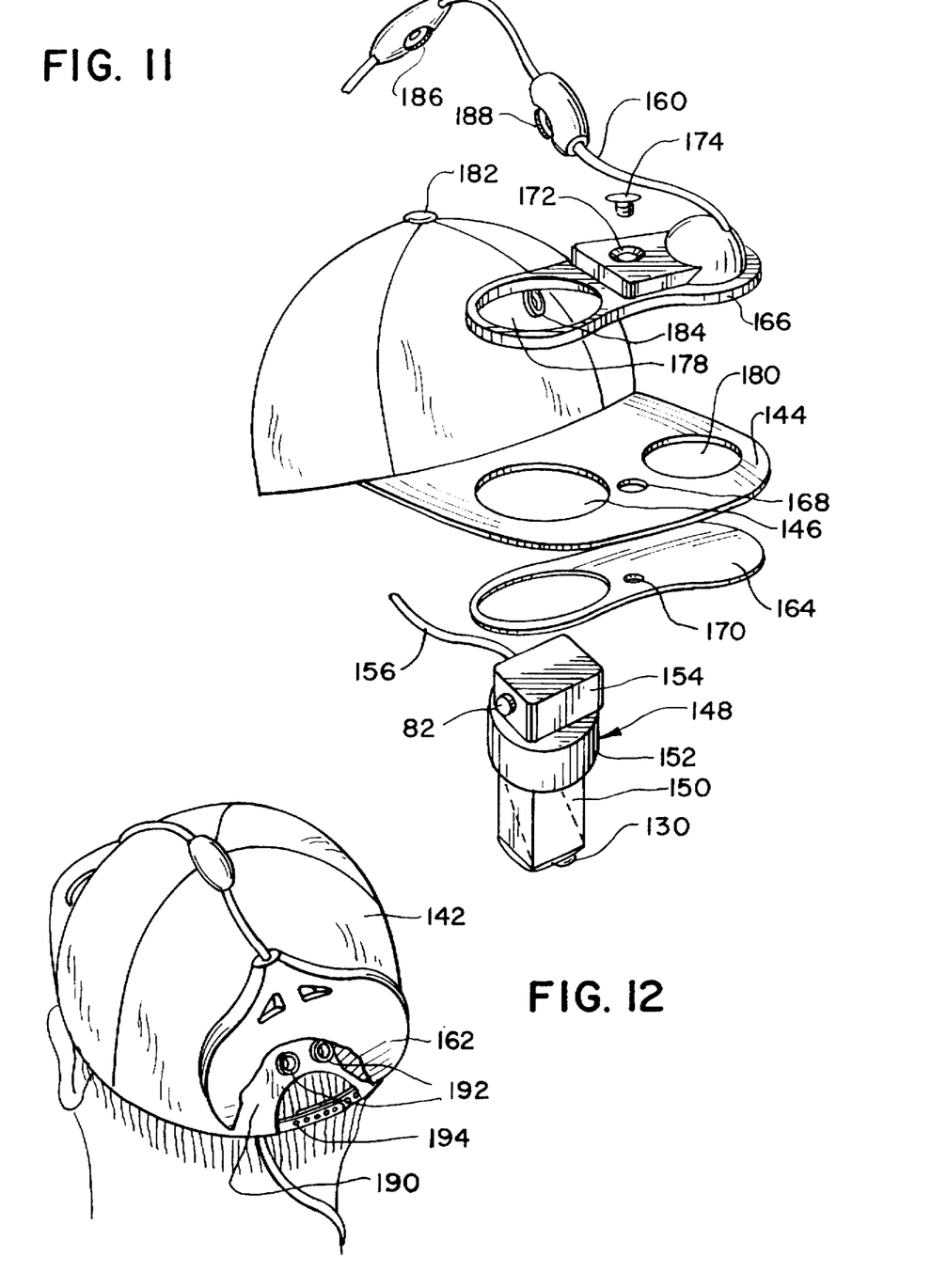
FIG. 11 is an exploded perspective view of the support and the image generating module of FIG. 10.
FIG. 12 is a back perspective view of the support of FIG. 10 with an electronics module thereof broken away to show the mounting of the module on the support.

A second embodiment of a support 140 for a head mounted display system in accordance with the present invention is depicted in FIG. 10–12. The support 140 takes the form of a baseball cap or the like with the cap portion 142 being formed of a conventional cloth material with a reinforced bill 144 extending outwardly therefrom, the bill 144 being rigid. This support can be manufactured very easily. Further, because it looks like a baseball cap, user's readily accept it. It is also noted that the baseball cap support 140 can bear logos for advertising and the like. The rigid bill 144 includes at least one aperture 146 through which an image generating module 148 extends. The image generating module 148 includes an optical element 150 of the type described above for the embodiment depicted in FIG. 1. The optical element 150 is mounted on a housing 152 for a display. The drive electronics for the display contained within the housing 152 are contained within a housing 154. The electronics within the housing 154 are electrically connected via a cable 156 and a cable 160 to an electronics module 162. The image generating module 148 is maintained on the rigid bill 144 by a bottom retaining member 164 and a top retaining member 166. The bottom retaining member 164 includes an aperture therein through which the optical element 150 extends. The bottom retaining member 164 also includes a threaded aperture 170 that is aligned with an aperture 168 in the rigid bill 144 and is further aligned with a threaded aperture 172 disposed in the top retaining member 166. A screw 174 is received within the apertures 172, 168 and 170 so as to attach the top retaining member 166 to the bottom retaining member 164. The upper retaining member 166 also includes an aperture 178 therein through which the display housing 152 and electronic housing 154 of the image generating module 148 extend. It is noted that the rigid bill 144 may be formed with a second aperture 180 so as to accommodate an image generating module disposed in front of the user's left eye as well as the unit 148 disposed in front of the user's right eye. Snap connectors 182 and 184 are positioned on the top and front of the cap portion 142 of the support 140 so as to be connectable with respective snap connectors 186 and 188 that are carried on the cable 160. The back portion 190 of the cap portion 142 includes a pair of snap connectors 192 that are mateable with snap connectors attached to the electronic module 162 in a manner similar to that described above with respect to FIG. 8 so as to removably mount the electronics module 162 on the back of the cap portion 142. The cap portion 142 is made adjustable utilizing a conventional size adjustor 194 of leather, plastic etc. as typically found on a baseball cap. Because the image generating module 148 as well as the electronics module 162 is removably mounted on the support 140 as shown in FIGS. 10–12 this embodiment of the present invention also allows each of a number of different users to have their own personal cap or support 140 while sharing a single image generating module 148 and electronics module 162 so that the system 10 may be utilized by a large number of users at low cost.

Many modifications and variations of the present invention are possible in light of the above teachings. For example, the support 12, 140 of the present invention is suitable for input devices such as a camera, microphone, etc. without a display system. The support 12, 140 is also suitable for output devices that are to be mounted on the user's head other than a display system. Thus, it is to be understood that, within the scope of the appended claims, the invention may be practiced otherwise than as described hereinabove.

We claim:

1. A support for an image display system to be worn on a user's head, said image display system including an image generating module with at least one optic into which a user looks to view a generated image, said support comprising:

a head hugging member having a front portion, a pair of side portions, a top portion and a back portion integrally formed from a material with multidirectional elasticity so that said side, top and back portions conform to and hug the user's head; and a rigid bill secured to the front portion of said head hugging member and extending outwardly from a user's forehead when said support is worn for removably mounting said image generating module, said rigid bill having an aperture therein through which a portion of said image generating module extends when said module is mounted on said bill.

2. A support for an image display system to be worn on a user's head as recited in claim 1 wherein said image display system includes an electronics module electrically connected to said image generating module, said electronics module including a first fastener member and said back portion of head hugging member having a second fastener member mateable with said first fastener member so as to removably mount said electronics module on a user's head.

3. A support for an image display system to be worn on a user's head as recited in claim 1 wherein said rigid bill includes a downwardly extending portion arcuately shaped so as to conform generally to a user's forehead; and at least one deformable member disposed on the interior of said downwardly extending portion of the rigid bill so as to deform to accommodate various users while providing a cushion between the user's head and said rigid bill.

4. A support for an image display system to be worn on a user's head as recited in claim 1 wherein said image generating module includes a display assembly that extends through said aperture in said rigid bill and said head hugging member includes a plurality of apertures overlying the general area of said display for ventilating heat from the display.

5. A support for an image display system to be worn on a user's head as recited in claim 1 wherein said back portion of said flexible head hugging member includes at least one integrally formed strap that hugs the base of the user's head so as to maintain the support securely on the user's head when the user's head is tilted back.

6. A support for an image display system to be worn on a user's head as recited in claim 1 including at least one rigid accessory attachment plate mounted on said head hugging member for removably mounting an accessory on said support.

7. A support for an image display system to be worn on a user's head as recited in claim 1 further including a tinted visor removably mounted on said support.

8. A support for an image display system to be worn on a user's head, said image display system including an image generating module with at least one optic into which a user looks to view a generated image, said support comprising:

a flexible head hugging member having a front portion, a pair of side portions, a top portion and a back portion integrally formed of microcellular neoprene with a knit backing attached to at least one side thereof, said side, top and back portions being conformable to a user's head to hug the user's head; and a rigid bill secured to the front portion of said head hugging member and extending outwardly from a user's forehead when said support is worn, said rigid bill providing a mounting surface for said image generating module on said support.

9. A support for an image display system to be worn on a user's head as recited in claim 8 wherein said image display system includes an electronics module electrically connected to said image generating module, said electronics module including a first fastener member and said back portion of said flexible head hugging member having a second fastener member mateable with said first fastener member so as to removably mount said electronics module on a user's head.

10. A support for an image display system to be worn on a user's head as recited in claim 8 wherein said rigid bill includes a downwardly extending portion arcuately shaped so as to conform generally to a user's forehead; and at least one deformable member disposed on the interior of said downwardly extending portion of the rigid bill so as to deform to accommodate various users while providing a cushion between the user's head and said rigid bill.

11. A support for an image display system to be worn on a user's head as recited in claim 8 wherein said image generating module includes a display assembly that extends through an aperture formed in said rigid bill and said flexible head hugging member includes a plurality of apertures overlying the general area of said display for ventilating head from the display.

12. A support for an image display system to be worn on a user's head as recited in claim 8 including at least one rigid accessory attachment plate mounted on said head hugging member for removably mounting an accessory on said support.

13. A support for an image display system to be worn on a user's head, said image display system including an image generating module with at least one optic into which a user looks to view a generated image and an electronics module electrically connected to said image generating module;

a flexible member forming a cap to be worn on a user's head, said cap having a front portion and a back portion;

a rigid bill secured to the front portion of said flexible member and extending outwardly from a user's forehead when said support is worn, said rigid bill providing a mounting surface for removably mounting said image generating module on said support; and at least one fastener mounted on the back portion of said flexible member for removably mounting said electronics module on said back portion of said flexible member.

14. A support for an image display system to be worn on a user's head as recited in claim 13 wherein said flexible member is formed of Neoprene.

15. A support for an image display system to be worn on a user's head as recited in claim 13 wherein said flexible member is formed of a cloth material.

16. A support for an image display system to be worn on a user's head as recited in claim 13 wherein said rigid bill includes an aperture through which said image generating module extends.

17. A support for an image display system to be worn on a user's head as recited in claim 16 wherein said support includes a top retaining member disposed on a top surface of said rigid bill and a bottom retaining member disposed adjacent a bottom surface of said rigid bill, each of said retaining members including an aperture in alignment with said aperture in said rigid bill to accommodate said image generating module and means for connecting said top retaining member, said rigid bill and said bottom retaining member together.

18. A support for input and output devices to be worn on a user's head, said support comprising:

a head hugging member having a front portion, a pair of side portions, a top portion and a back portion integrally formed from microcellular neoprene with a knit backing attached to one side of said neoprene;

at least one rigid accessory attachment plate mounted on said head hugging member for mounting on said support an input device and/or an output device to be worn on a user's head; and a rigid bill secured to the front portion of said head hugging member and extending outwardly from a user's forehead when said support is worn, said rigid bill providing a mounting surface for an image generating output device and said rigid bill including at least one locating pin for locating said rigid accessory attachment plate with respect to the mounting surface for said image generating device.

19. A support for input and output devices to be worn on a user's head as recited in claim 18 wherein said rigid accessory attachment plate removably mounts an earphone output device onto said support.

20. A support for input and output devices to be worn on a user's head as recited in claim 18 wherein said image generating output device includes a display and said attachment plate mounts a camera input device at a fixed location with respect to said display.

* * * * *